United States Patent
Huelke et al.

(10) Patent No.: US 9,291,182 B2
(45) Date of Patent: Mar. 22, 2016

(54) VEHICLE ATTACHMENT SYSTEM HAVING A DOMED-HEAD FASTENER

(75) Inventors: David Huelke, Milan, MI (US); Justin Lee Healy, Canton, MI (US); Todd Jared Konet, Canton, MI (US); James Allen Stec, Brownstown, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 272 days.

(21) Appl. No.: 13/551,076

(22) Filed: Jul. 17, 2012

(65) Prior Publication Data

US 2014/0020213 A1 Jan. 23, 2014

(51) Int. Cl.
*F16B 5/06* (2006.01)
*F16B 21/08* (2006.01)

(52) U.S. Cl.
CPC ............. *F16B 5/0657* (2013.01); *F16B 21/086* (2013.01); *Y10T 24/303* (2015.01)

(58) Field of Classification Search
CPC .......... F16B 5/128; F16B 5/125; F16B 5/126; F16B 21/086; B60J 10/0051; B60J 10/0062; B60J 13/0206; B60R 13/2012; A44B 17/007; Y10T 24/45775; Y10T 24/309; Y10T 24/42
USPC .................................................. 24/292, 297
See application file for complete search history.

(56) References Cited

U.S. PATENT DOCUMENTS

| | | | | |
|---|---|---|---|---|
| 1,556,233 A * | 10/1925 | Maise | ............................. | 52/511 |
| 3,029,486 A * | 4/1962 | Raymond | ..................... | 411/509 |
| 4,017,945 A * | 4/1977 | Stanik et al. | ..................... | 24/624 |
| 4,973,212 A * | 11/1990 | Jacobs | ........................... | 411/508 |
| 5,038,444 A * | 8/1991 | Gordon | ........................... | 24/292 |
| 5,980,230 A | 11/1999 | Dowd et al. | | |
| 6,584,655 B1 * | 7/2003 | Cardwell et al. | ................ | 24/643 |
| 6,634,693 B2 * | 10/2003 | Straesser, Jr. | ................... | 296/70 |
| 6,761,411 B2 | 7/2004 | Boehmer et al. | | |
| 7,185,941 B2 | 3/2007 | Klein et al. | | |
| 7,328,489 B2 * | 2/2008 | Leverger et al. | ................ | 24/453 |
| 7,547,061 B2 | 6/2009 | Horimatsu et al. | | |
| 8,474,111 B2 * | 7/2013 | Ribes Marti | .................... | 24/458 |
| 8,495,802 B2 * | 7/2013 | Okada et al. | .................... | 24/297 |
| 8,584,325 B2 * | 11/2013 | Onuma | ......................... | 24/297 |
| 8,613,128 B2 * | 12/2013 | Moerke et al. | .................. | 24/453 |
| 8,695,177 B2 * | 4/2014 | Kato et al. | ...................... | 24/297 |
| 8,757,951 B2 * | 6/2014 | Rosemann et al. | ........... | 411/508 |
| 2008/0056810 A1 * | 3/2008 | Granata | ........................ | 403/121 |
| 2009/0064467 A1 * | 3/2009 | Xueyong et al. | ................ | 24/292 |
| 2009/0188086 A1 * | 7/2009 | Okada et al. | .................... | 24/297 |
| 2011/0020093 A1 * | 1/2011 | Busch et al. | .................. | 411/358 |
| 2012/0284975 A1 * | 11/2012 | Clarke et al. | ................. | 24/595.1 |
| 2013/0280005 A1 * | 10/2013 | Lepper | ............................ | 411/15 |

* cited by examiner

*Primary Examiner* — Victor Batson
*Assistant Examiner* — Matthew Sullivan
(74) *Attorney, Agent, or Firm* — Vichit Chea; Price Heneveld LLP

(57) ABSTRACT

An attachment system for mounting a trim component to a vehicle body panel having an aperture includes a self-locating fastener affixed to the trim component. The fastener has a domed head that terminates at a shoulder and includes a plurality of legs separated by a gap and configured to resiliently deflect inward. The domed head is configured to provide for location of the trim component relative to the body panel during installation, and the shoulder is configured to engage the aperture upon installation.

19 Claims, 3 Drawing Sheets

VEHICLE ATTACHMENT SYSTEM HAVING A DOMED-HEAD FASTENER

FIELD OF THE INVENTION

The present invention generally relates to a vehicle attachment system having a domed-head fastener, and more particularly to a fastener having a domed head for mounting a trim component to a vehicle body panel such as a headliner to a vehicle roof structure.

BACKGROUND OF THE INVENTION

The body structure of a vehicle roof typically includes a roof panel and several roof headers and bows, which are closed-section or channel-shaped structures secured to the vehicle body that extend along the length and across the width of the vehicle roof to provide support for the roof panel. A headliner is normally attached to the interior side of the roof structure to provide an attractive appearance for the interior of the vehicle. Headliners have been attached to the roof of vehicles in a variety of manners, including using screw or snap-in fasteners, adhesives, magnets, and hook and loop type fasteners such as VELCRO.

SUMMARY OF THE INVENTION

One aspect of the present invention includes an attachment system for mounting a trim component to a vehicle body panel having an aperture. The attachment system includes a self-locating fastener affixed to the trim component, and the fastener has a domed head that terminates at a shoulder. The domed head includes a plurality of legs separated by a gap and configured to resiliently deflect inward. Further, the domed head is configured to provide for location of the trim component relative to the body panel during installation, and the shoulder is configured to engage the aperture upon installation.

Another aspect of the present invention includes an attachment system for mounting a headliner to a vehicle roof structure having an aperture. The attachment system includes a self-locating fastener affixed to the headliner, and the fastener has a domed head that terminates at a shoulder. The domed head includes a plurality of legs separated by a gap and configured to resiliently deflect inward. Further, the domed head is configured to provide for location of the headliner relative to the roof structure during installation, and the shoulder is configured to engage the aperture upon installation.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
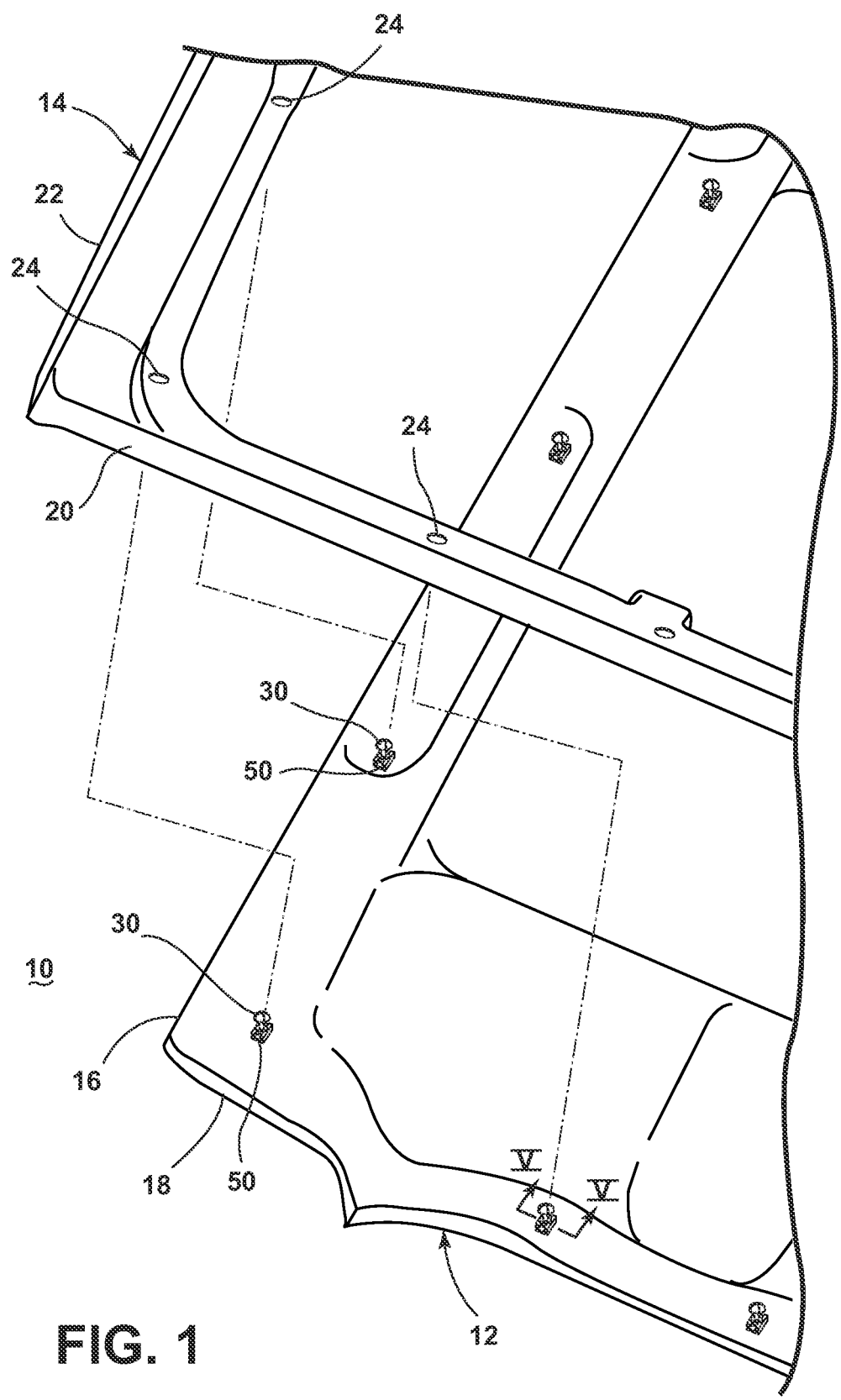
FIG. 1 is a top perspective, exploded view of an attachment system mounting a headliner to a vehicle body panel, according to one embodiment.
Figure 2:
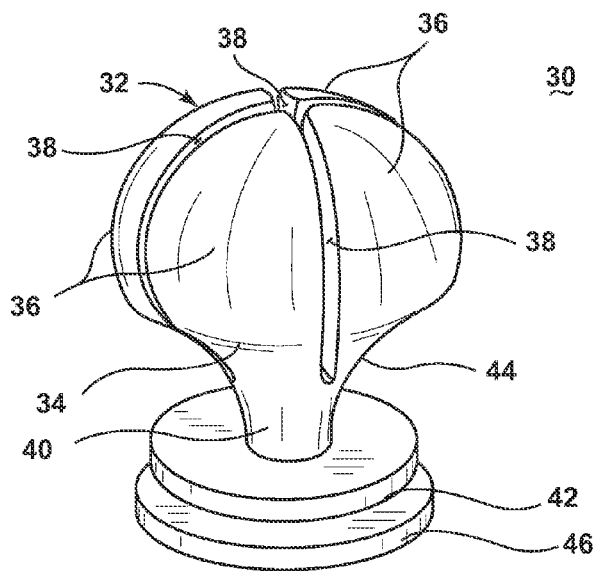
FIG. 2 is top perspective view of a fastener of the attachment system of FIG. 1.

For purposes of description herein, the terms "upper," "lower," "right," "left," "rear," "front," "vertical," "horizontal," "interior," "exterior," and derivatives thereof shall relate to the attachment system as oriented in FIGS. 1 and 2. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-5, reference numeral 10 generally designates an attachment system for mounting a trim component 12, such as a headliner, to a body panel 14 of an automotive vehicle. In the illustrated embodiment, the trim component 12 is shown in the form of a headliner; however, other trim components, including pillar trim, interior panels, and the like are contemplated according to other embodiments. Further, the body structure 14 is shown in the form of a roof structure; however, other body structures, including pillars, body panels, and the like are contemplated.

The headliner 12 may be a formed and molded headliner for mounting to the interior of the roof structure 14 of the vehicle, so as to provide an aesthetically pleasing appearance for the interior thereof. The headliner 12 has an exterior surface 16 which faces the supporting roof structure 14 when installed in the vehicle, and an opposite, interior surface 18 that is upholstered to provide a decorative surface visible from the interior of the vehicle. The headliner 12 is shaped to conform to the roof structure 12 and may include a plurality of contours and apertures for mounting various overhead components, such as sun visors, overhead consoles, grab handles, lights, and the like. The roof structure 14 includes a pair of spaced side rails 20, and at least a front header 22, a rear header, and may also include additional roof bows, as is conventional. A plurality of apertures 24 is located in the roof structure 14.

Figure 3:
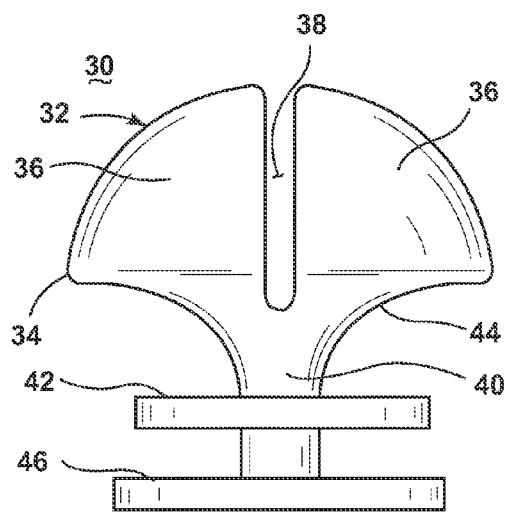
FIG. 3 is a side view of the fastener of FIG. 1.
Figure 4:
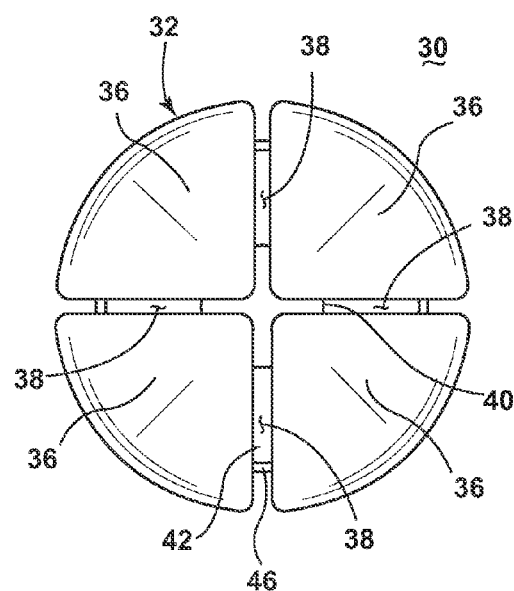
FIG. 4 is a top view of the fastener of FIG. 1.

Referring now to FIGS. 2-4, the attachment system 10 further includes one or more self-locking fasteners 30 for matingly engaging the apertures 24. Each self-locating fastener 30 has a domed head 32 that terminates at a shoulder 34. The domed head 32 is made up of a plurality of legs 36 separated by a gap 38. The legs 36 are configured to resiliently deflect inward during installation of the fastener 30. In the illustrated embodiment, the fastener 30 is shown having four legs 36; however it is contemplated that any number of legs 36 is feasible, for example two and three legs 36 according to other embodiments. The fastener 30 further includes a shaft 40 and a base 42 at the lower end. The domed head 32, shaft 40, and base 42 are co-axially aligned, with the shaft 40 extending between the domed head 32 and the base 42.

As best seen in FIG. 3, the gap 38 is shown extending from the apex of the domed head 32 to a distance below the shoulder 34. However, it is contemplated that the specifically designed length and width of the gap 38 can be modified to adjust the flexibility of the legs 36. As is easily understood by one skilled in the art, both increasing the length of the gap 38 and increasing the width of the gap 38 will result in more flexible legs 36. The converse holds true also. Adjusting the designed flexibility of the legs 36 allows for greater control over the amount of force, referred to in the industry as the insertion force, required to insert the fastener 30 into the aperture 24.

The fastener 30 also includes a tapered portion 44 disposed between the shoulder 34 and the shaft 40. The tapered portion 44 is configured to reduce the amount of force, referred to in the industry as the extraction force, required to remove the fastener 30 from the roof structure 14 aperture 24. The specifically designed curvature of the tapered portion 44 can be modified to adjust the extraction force required to remove the fastener 30. Additionally, the tapered portion 44 can extend about the entire periphery of the shoulder 34 and shaft 40, or it may be in the form of spaced ribs that extend between the shoulder 34 and the shaft 40. In the embodiment wherein the tapered portion 44 is made up of spaced ribs, any number of ribs is feasible. As is easily understood by one skilled in the art, the greater the curvature in the tapered portion 44 that transitions from the shaft 40 to the shoulder 34, the lower the extraction force required to removed the fastener 30; the opposite holds true also.

The fastener 30 is considered to have a low profile, meaning the ratio of width to height of the domed head 32 is at least equal to one. In one embodiment, the domed head 32 has a diameter that is equal to or greater than the height of the domed head 32. In another embodiment, the ratio of the diameter to height of the domed head 32 is within a range of one to three. In yet another embodiment, the ratio of the diameter to height of the domed head 32 is approximately two. In any case, the diameter is, at a minimum, equal to the height of the domed head 32. Further, the shaft 40 is substantially short, such that the domed head 32 is positioned relatively close to the surface to which the fastener 30 is mounted.

Figure 5:
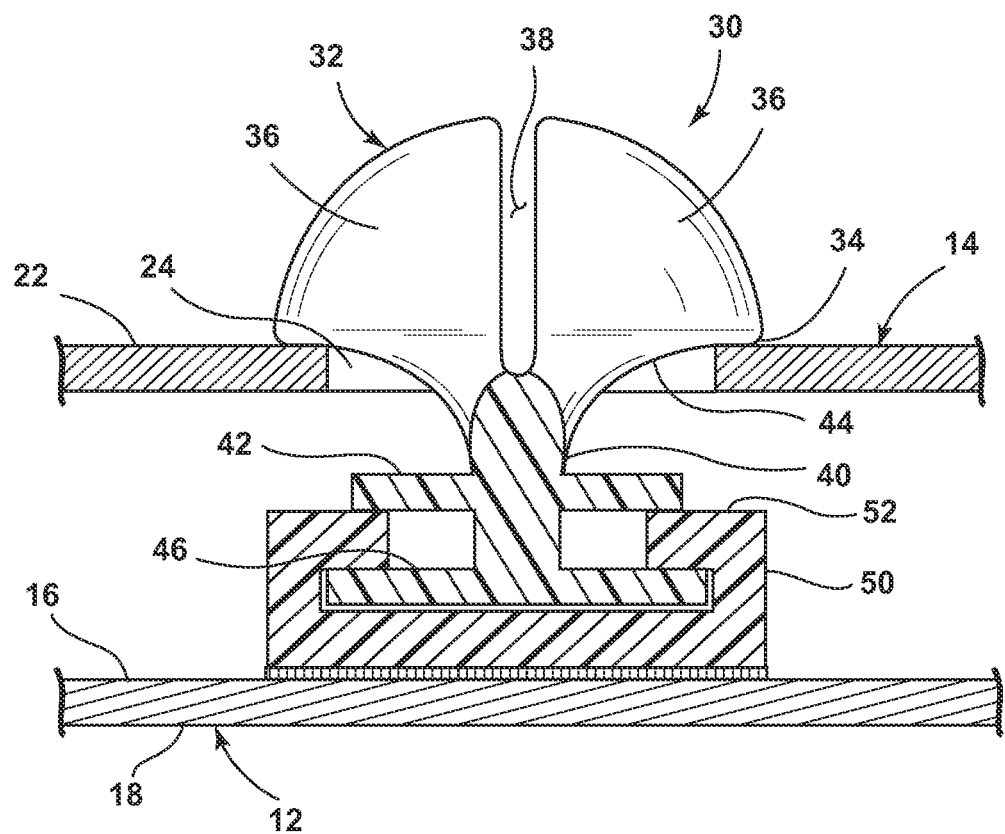
FIG. 5 is a cross-sectional side view of the attachment system, taken along line V-V of FIG. 1.

Referring now to FIG. 5, the fastener 30 is shown mounted to the headliner 12. The base 42 of the fastener 30 can be bonded to the exterior surface 16 of the headliner 12 by a layer of hot melt adhesive, or any other suitable glue, adhesive, or means of attaching the base 42 to the headliner 12. In one embodiment, the base 42 may include a bottom plate 46 for inserting into a carrier 50. The bottom plate 46 is spaced from the base 42, and the shaft 40 extends therebetween. The carrier 50 includes an opening in a top wall 52 in the shape of a keyhole. The carrier 50 may be bonded to the surface 16 of the headliner 12 by a layer of hot melt adhesive, or any other suitable glue, adhesive, or means of attaching the carrier 50 to the headliner 12. The fastener 30 is assembled to the carrier 50 by inserting the bottom plate 46 into the keyhole on the top wall 52. The space between the base 42 and the bottom plate 46 is sized and configured to receive the top wall 53 of the carrier 50.

The headliner 12, with the fasteners 30 bonded to the exterior surface 16 thereof, is installed during assembly of the vehicle. The fasteners 30 and apertures 24 are located on the headliner 12 and roof structure 14, respectively, so that they are aligned when the headliner 12 is installed on the vehicle. When the headliner 12 is positioned in general alignment for installation, the fasteners 30 are inserted into the apertures 24, flexing the resilient legs 36 inward as the domed head 32 passes through the aperture 24. The shoulder 34 of the fastener 30 is configured to engage the periphery of the aperture 24, thereby retaining the headliner 12 to the roof structure 14.

The attachment system 10 described herein, and particularly the domed head 32, is configured to provide for location of the headliner 12 relative to the roof structure 14 during installation in the vehicle. The curvature of the domed head 32 is one aspect that makes the fastener 30 "self-locating". During installation, precise alignment of the fastener 30 and the aperture 24 is less critical because, generally speaking, as long as a portion of the domed head 32 contacts the aperture 24, the curvature of the surface on the domed head 32 will guide the fastener 30 into proper alignment. This is beneficial when considering the design tolerances that must be accounted for during design of the relevant components.

Additionally, self-locating fasteners 30 are particularly beneficial when assembly of the trim component 12 to the vehicle body panel 14 is a blind installation operation. Assembling components is considered a "blind installation" when the operator is not able to view either the fastener 30 or the aperture 24 during installation. Trim components are often assembled by blind installation because they often have fasteners that are not visible from within the vehicle interior. Assembling the headliner 12 to the vehicle roof structure 14 is a good example of blind installation. As the operator moves the headliner 12 into position, above his/her head, visibility of the fastener 30 is lost. The operator must then blindly guide the fastener 30 into the aperture 24. This is why the curved surface of the domed head 32 is helpful in guiding the fastener 30 into the aperture 24.

It will be understood by one having ordinary skill in the art that construction of the described attachment system and other components is not limited to any specific material. Other exemplary embodiments of the invention disclosed herein may be formed from a wide variety of materials, unless described otherwise herein.

It is also important to note that the construction and arrangement of the elements of the attachment system as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

We claim:

1. An attachment system for mounting a trim component to a vehicle body panel having an aperture, the attachment system comprising:
    a self-locating fastener affixed to the trim component, the fastener comprising:
        a base including a pair of discs spaced apart along an axis;
        a shaft extending from the base along the axis;
        a plurality of legs separated by a corresponding plurality of gaps and resiliently deflectable inward, the plurality of legs collectively defining a domed head terminating at a shoulder; and
        at least one inwardly-tapering portion extending from the shoulder to contact a portion of the shaft.

2. The attachment system of claim 1, wherein the fastener comprises four legs separated by four gaps terminating within the inwardly-tapered portion such that the legs are supported on one of the shaft and the tapered portion.

3. The attachment system of claim 1, wherein the trim component is configured to be mounted to the vehicle body panel in a blind installation operation.

4. The attachment system of claim 1, wherein the domed head has a diameter that is greater than or equal to a height of the domed head such that the domed head has a low profile.

5. The attachment system of claim 4, wherein a ratio of the diameter to height of the domed head is within a range of one to three.

6. The attachment system of claim 5, wherein the ratio of the diameter to height of the domed head is about two.

7. The attachment system of claim 1, wherein the domed head, shaft, and base are co-axially aligned.

8. The attachment system of claim 1, wherein the base is affixed to the trim component.

9. The attachment system of claim 1, wherein the tapered portion extends initially inwardly from the shoulder in a direction perpendicular to the shaft and smoothly curves to intersect tangentially with the shaft.

10. An attachment system for mounting a headliner to a vehicle roof structure having an aperture, the attachment system comprising:
    a self-locating fastener affixed to the headliner, the fastener comprising:
        a domed head that terminates at a shoulder;
        a shaft extending from a base along an axis, the base including a pair of discs spaced apart along the axis;
        a tapered portion extending inwardly from the shoulder and joining with the shaft;
        a plurality of gaps dividing the domed head into a plurality of inwardly-deflectable legs and terminating within the tapered portion.

11. The attachment system of claim 10, wherein the fastener comprises four legs supported on one of an intermediate area of the tapered portion and the shaft.

12. The attachment system of claim 10, wherein the headliner is configured to be mounted to the vehicle roof structure in a blind installation operation.

13. The attachment system of claim 10, wherein the domed head has a diameter that is greater than or equal to a height of the domed head such that the domed head has a low profile.

14. The attachment system of claim 13, wherein a ratio of the diameter to height of the domed head is within a range of one to three.

15. The attachment system of claim 14, wherein the ratio of the diameter to height of the domed head is about two.

16. The attachment system of claim 15 wherein the domed head, shaft, and base are co-axially aligned.

17. The attachment system of claim 10, wherein the base is affixed to an exterior surface of the headliner.

18. The attachment system of claim 10, wherein the tapered portion extends initially inwardly from the shoulder in a direction perpendicular to the shaft and smoothly curves to intersect tangentially with the shaft.

19. A self-locating fastener for fastening a trim component to a vehicle body panel, the fastener comprising:
    a base including first and second discs spaced apart from each other along an axis;
    a shaft extending from the base along the axis;
    a plurality of inwardly deflectable legs separated by a corresponding plurality of gaps, the plurality of legs collectively defining a domed head terminating at a shoulder; and
    a tapered portion extending initially inwardly from the shoulder and curving to smoothly join with the shaft.

* * * * *